United States Patent [19]
König et al.

[11] Patent Number: 4,793,629
[45] Date of Patent: Dec. 27, 1988

[54] GUIDING LINK BEARING SYSTEM FOR A WHEEL SUSPENSION OF A MOTOR VEHICLE

[75] Inventors: Gerhard König, Löchgau; Jan Tschunko, Stuttgart, both of Fed. Rep. of Germany

[73] Assignee: Dr. Ing. h.c.F. Porsche Aktiengesellschaft, Fed. Rep. of Germany

[21] Appl. No.: 100,347

[22] Filed: Sep. 23, 1987

[30] Foreign Application Priority Data

Nov. 6, 1986 [DE] Fed. Rep. of Germany ....... 3637920

[51] Int. Cl.⁴ .............................................. B62D 7/02
[52] U.S. Cl. .................................... 280/688; 280/716; 280/724; 280/781
[58] Field of Search ............... 280/666, 668, 670, 671, 280/673, 691, 692, 696, 701, 716, 724, 688; 267/63 R

[56] References Cited

U.S. PATENT DOCUMENTS

| 3,181,882 | 5/1965 | Rosky et al. | 280/666 |
| 3,520,554 | 7/1970 | Ravenel | 280/688 |
| 4,515,391 | 5/1985 | Koide | 280/690 |

FOREIGN PATENT DOCUMENTS

| 0193847 | 9/1986 | European Pat. Off. . |
| 3441560 | 5/1986 | Fed. Rep. of Germany . |
| 753813 | 8/1953 | United Kingdom . |

*Primary Examiner*—Kenneth R. Rice
*Attorney, Agent, or Firm*—Barnes & Thornburg

[57] ABSTRACT

A guiding link bearing arrangement for a wheel suspension of a motor vehicle has an elastic link bearing that is supported at a carrier of the body structure of the vehicle. This link bearing is held at the free lower end of a supporting arm extending in a vertical plane and is fastened at walls of the carrier that are separated a distance from one another.

13 Claims, 6 Drawing Sheets

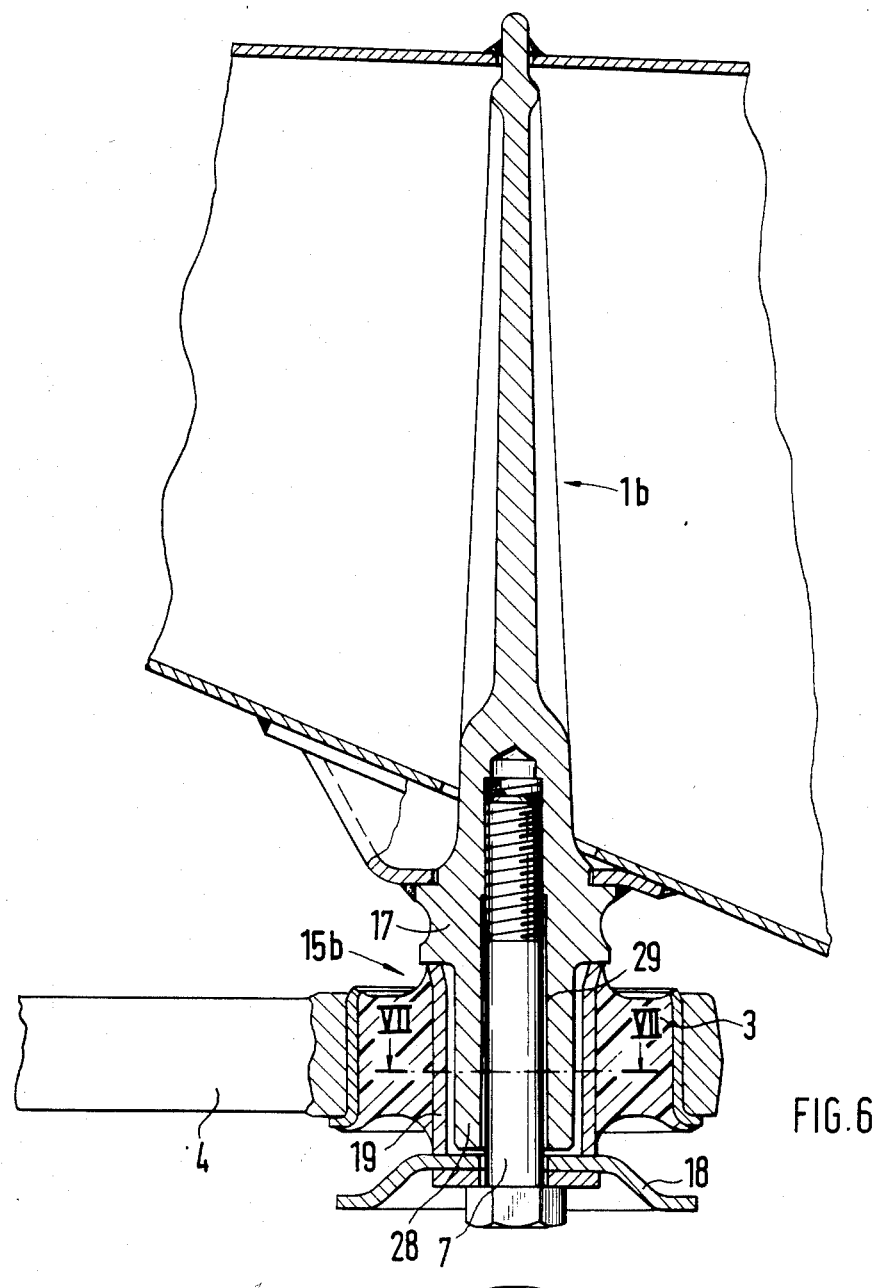
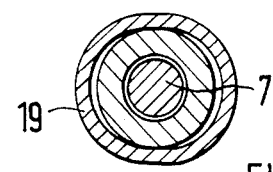
FIG.6
FIG.7

4,793,629

GUIDING LINK BEARING SYSTEM FOR A WHEEL SUSPENSION OF A MOTOR VEHICLE

BACKGROUND AND SUMMARY OF THE INVENTION

The present invention relates to a guiding link bearing system for a wheel suspension of a motor vehicle in which an elastic link bearing is supported at a carrier of the body structure of the vehicle.

From German Published Unexamined patent application No. 3,441,560, a vertical link bearing is known that is held via a bearing bracket reaching under the bearing, is connected with it via a screw and is fastened in a weld nut held on the side of the carrier. The bearing is held at the bearing bracket at a distance from the carrier, so that the remaining space is bridged by an end part of the elastic bearing sleeve that supports itself at the carrier. In this design, a constructively costly bearing holding means is required in order to absorb forces affecting the bearing that, in addition to the fixing via the screw at the carrier, requires the bearing bracket. As a result of the space that has to remain, the securing screw, during assembly, cannot be screwed in to the stop but only to a limited extent. This requires a measuring of the space that must remain. It is also a disadvantage in the case of this type of construction that as a result of the not rigidly limited threading depth, the elastic element is easily deformed and a desired bearing characteristic is no longer ensured.

An objective of the present invention is to provide a guiding link bearing system in which a direct introduction of force into the side member or carrier is ensured, and the link bearing is easily mountable from the direction of the underside of the vehicle.

This and other objectives are achieved in the present invention by providing a guiding link bearing arrangement with supporting arm means having a free lower end, this supporting arm means being fastened at upper and lower walls of the carrier. These upper and lower walls are separated a distance from one another, and the elastic link bearing is held at the free lower end.

The main advantages achieved by means of the invention are that the bearing can be easily placed at or fitted onto the supporting arm. A fixing takes place by a screw or by a nut without the distortion of the elastic element and thus a disadvantageous change of the bearing characteristic. This is possible because of the bush clamped in between the collar and the rebound plate. The fixing of the bearing via the screw at the carrier takes place without measurements, which have been hitherto required in the state of the art, because a space between the carrier and the bearing should be maintained in a certain manner in order to ensure a desired characteristic of the elastic element.

It is also an advantage of the present invention that forces affecting the bearing via the supporting arm are introduced directly into the carrier of the body structure of the vehicle. In this case, the double fastening, once in the upper carrier wall and once in the lower carrier wall, results in a relatively large support base. Thus, transverse and longitudinal forces are optimally absorbable and introduceable into the carrier without a tilting of the bearing.

The supporting arm for the fastening in the carrier is fitted from below into the openings and is fastened in these openings by a weld. So that for a carrier having a diagonally extending lower wall, a supporting is possible that is located in a horizontal plane, a bearing support is fastened at the carrier with a horizontal support surface that will then form a corresponding support for the collar of the supporting arm.

According to certain preferred embodiments of the invention, the collar of the supporting arm has longitudinal grooves having the same axes into which corresponding projections of the bush engage so that in longitudinal direction, a frictionally engaged connection and in transverse direction, a form-fitting connection is created between the supporting arm and the bush.

Other objects, advantages and novel features of the present invention will become apparent from the following detailed description of the invention when considered in conjunction with the accompanying drawings.

BRIEF DESCRIPTION OF THE DRAWINGS

FIG. 4 is a sectional view according to the Line IV—IV of FIG. 2.

FIG. 6 is a lateral, partly sectional view of another preferred embodiment of the present invention.

FIG. 7 is a sectional view according to the Line VII—VII of FIG. 6.

DETAILED DESCRIPTION OF THE INVENTION

Figure 1:
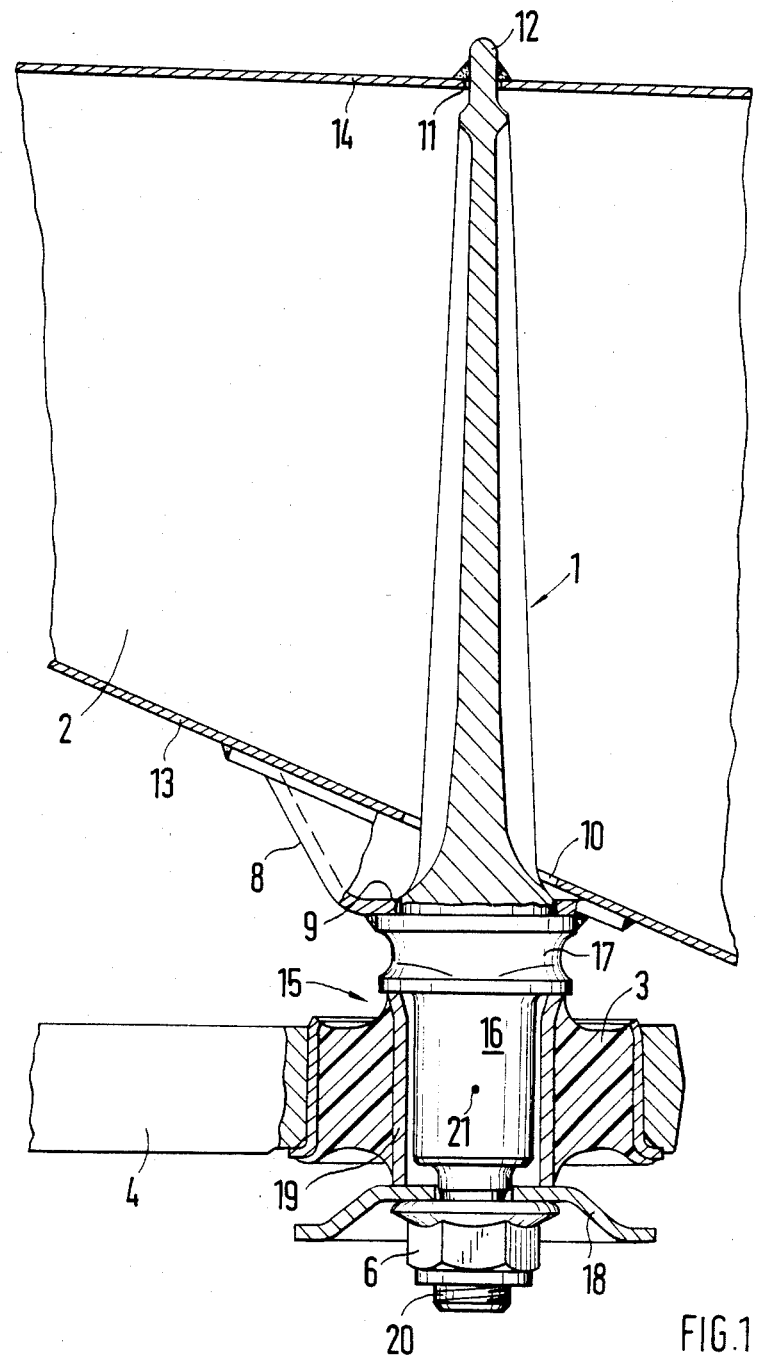
FIG. 1 is a lateral, partly sectional view of a link bearing constructed in accordance with a preferred embodiment of the present invention.

As seen in the Figures, the guide link bearing system of the present invention comprises a supporting arm 1 that is fastened in a side member 2 and that on its end side below the side member or carrier 2 carries an elastic link bearing 3. This elastic link bearing 3 is connected with a wheel guiding link 4 that has another bearing 5 on the side of the body. Opposite these bearings 3 and 5, the wheel is coupled to a wheel carrier which is not shown in detail.

FIG. 1 shows an embodiment of a supporting arm 1 with a holding nut 6. In further embodiments shown in FIGS. 2, 3 and 6, the supporting arm 1a is equipped with a threaded bolt 7. The nut 6 as well as the bolt 7 have the same objective, namely to fix the link bearing 3 at the carrier 2.

Figure 3:
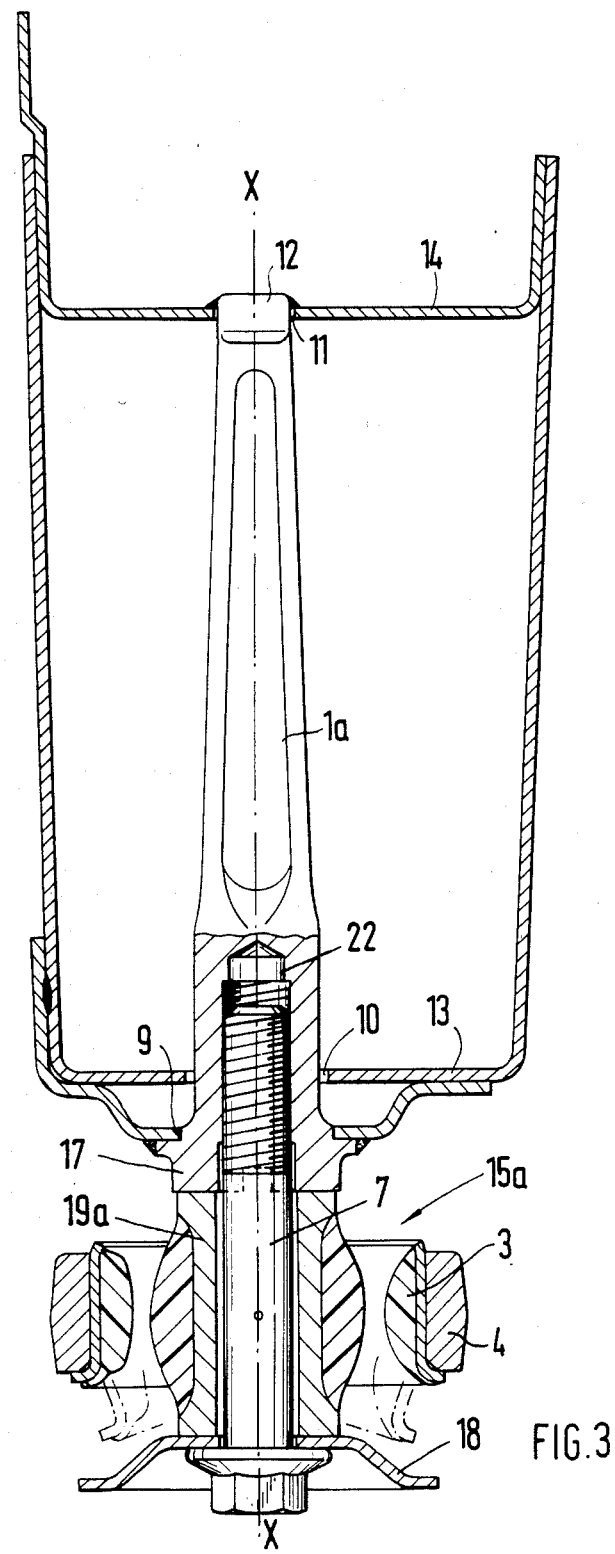
FIG. 3 is a sectional front view of the link bearing and supporting arm of FIG. 2.

The supporting arm 1; 1a; 1b (FIG. 6) extends in a vertical plane X—X through the carrier 2 (as shown in FIG. 3) and by self-substance (a weld) is fastened at the carrier 2 and a bearing support 8.

For the mounting, the supporting arm 1; 1a; 1b is fitted through an opening 9 into the bearing support 8 and through another opening 10 of a lower carrier wall 13. With its upper free end 12, the supporting arm 1; 1a; 1b is threaded into an opening 11 of the upper carrier wall 14. The welding of the supporting arm 1; 1a; 1b takes place at the upper carrier wall 14 as well as at the bearing support 8.

In the embodiment of FIG. 1, at its free lower end 15, the supporting arm 1 has a bearing bolt 16 that comprises a holding collar 17 supporting itself at the bearing support 8. Between this holding collar 17 and a rebound plate 18, the link bearing 3 is arranged on the bolt 16, a bush 19 being clamped in between the collar 17 and the rebound plate 18. For the fastening, the nut 6 is used which, on the end side of the bolt 16, is screwed onto a threaded part 20 of the supporting arm 1.

The bush 19 supports itself directly at the collar 17 of the supporting arm 1. The collar 17, by means of the bearing support 8, supports itself at the carrier 2 or at the lower and upper carrier walls 13, 14 so that the occurring longitudinal and transverse forces cannot cause any tilting of the supporting arm because of the relatively large fastening base. In addition, the bearing center 21 is placed close to the supporting point of the arm at the bearing support 8.

Figure 2:
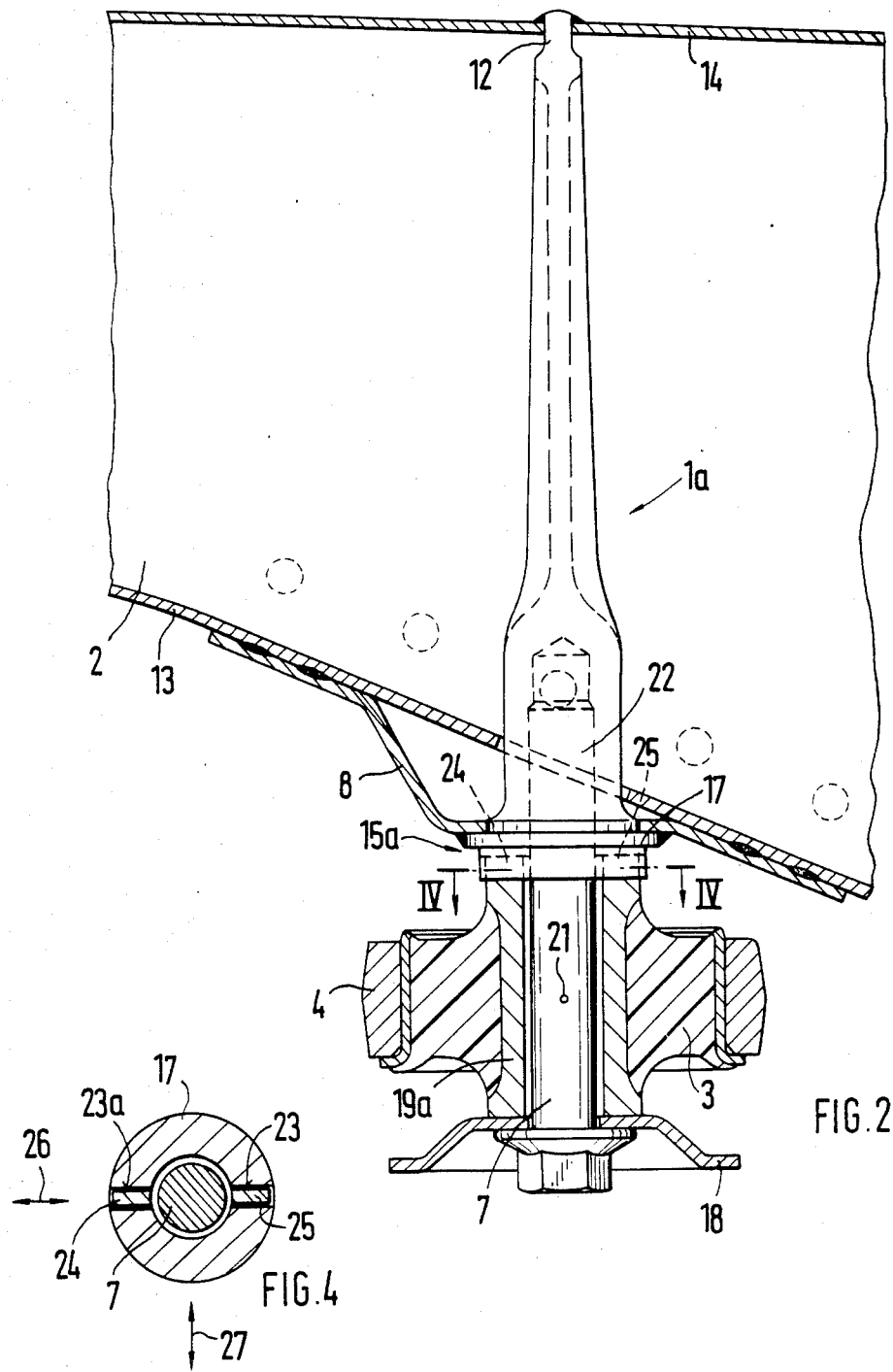
FIG. 2 is a lateral, partly sectional view of a further preferred embodiment of the present invention.

According to the preferred embodiment shown in FIGS. 2 and 3, the supporting arm 1a, at its lower end 15a that ends with the collar 17, has a threaded bore 22 for the threaded bolt 7. A rebound plate 18 is arranged on this bolt 7, a bush 19a of the bearing 3 being clamped in between this rebound plate 18 and the collar 17. This bush 19a supports itself directly at the holding collar 17 which, in the embodiment shown in FIGS. 2 and 4, has longitudinal grooves 23 and 23a with the same axes (FIG. 4), into which corresponding projections 24, 25 of the opposing bush 19a engage. The projections 24, 25 hold the collar 17 with respect to the supporting arm 1a in longitudinal direction 26 in a frictionally engaged manner, and in transverse direction 27, in a form-fitting manner.

According to the preferred embodiment of the supporting arm 1b seen in FIG. 6, the supporting arm 1b, at its free end 15b, has a bearing core 28 projecting beyond the collar 17 that receives the elastic bearing 3. In the bearing core 28, a pocket bore 29 is provided that reaches over the collar 17. As a result, it becomes possible to provide a thread connection that is protected with respect to corrosion.

Figure 9:
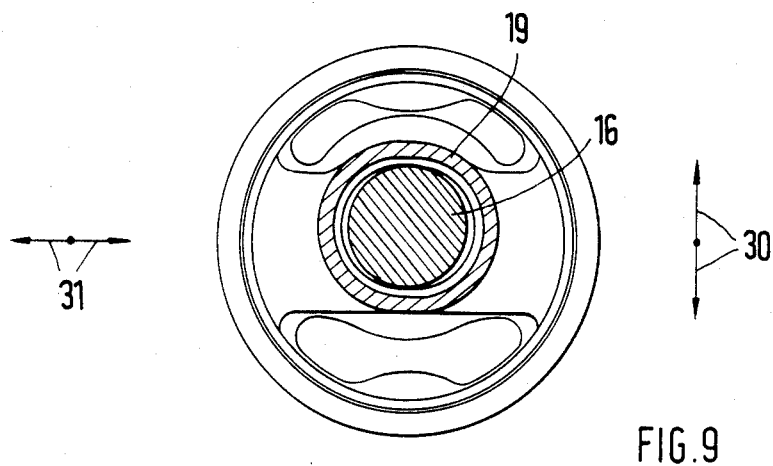
FIG. 9 is a front view of the bearing of FIG. 8 viewed in the direction of the Arrow Z.

As seen in FIG. 9, the elastic bearing 3, in certain preferred embodiments, has an oval bush 19 that in transverse direction 30 is form-fitting with the bolt 16, but in longitudinal direction 31, has play with respect to the bolt 16. As a result, the bush 19 can shift within the scope of the ovality, so that tolerance deviations can be balanced. After the tightening of the nut 6, the bush 19 is held in a frictionally engaged manner in longitudinal direction 31.

The supporting arm 1; 1a; 1b in certain preferred embodiments, consists preferably of metal, such as steel or aluminum, but in other preferred embodiments is made of a plastic material and has a shape that tapers off in the direction of the upper free end 12.

Figure 5:
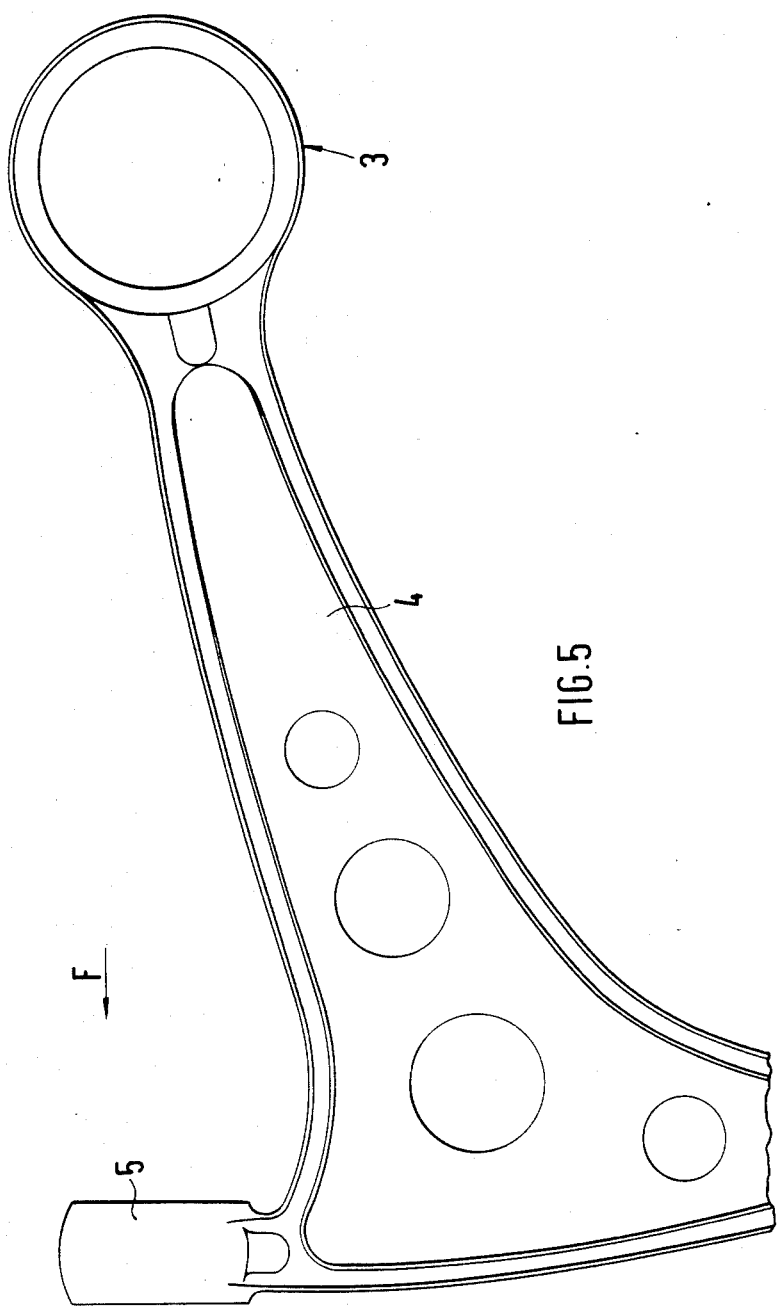
FIG. 5 is a top view of a guiding link with the link bearing.
Figure 8:
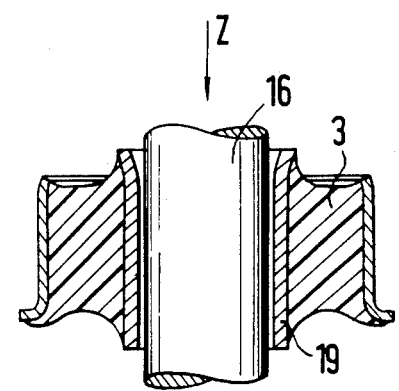
FIG. 8 is a sectional representation of a preferred embodiment of an elastic bearing.

As shown in detail in FIG. 5, the wheel suspension element comprises an A-arm that has a bearing 5 with a horizontal bearing axis that is located in front, viewed in driving direction F, whereas the rear elastic bearing 3 has a vertical axis and is coordinated in such a way that cardanic movements are possible.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A guiding link bearing arrangement for a wheel suspension of a motor vehicle, in which an elastic link bearing is supported at a carrier of the body structure of said vehicle, comprising:
    supporting arm means having a free lower end, said supporting arm means fixedly and rigidly being fastened at upper and lower walls of said carrier which are separated a distance from one another;
    wherein said elastic link bearing is held at said free lower end.

2. An arrangement according to claim 1, wherein said supporting arm means extends in a vertical plane.

3. An arrangement according to claim 2, wherein said supporting arm means, comprises a bearing bolt that projects beyond said lower carrier wall, said bearing bolt on one end having thread means for threadably engaging a holding nut.

4. An arrangement according to claim 2, wherein said free lower end of said supporting arm means has thread bore means for threadably engaging threaded bolt means for holding said elastic bearing means at said supporting arm means.

5. An arrangement according to claim 4, further comprising a vertical bush of said link bearing, wherein said free lower end of said supporting arm means includes an end face forming support means for said vertical bush of said link bearing directly with respect to said carrier.

6. An arrangement according to claim 5, further comprising bearing support means connected with said carrier, wherein said supporting arm means at said free lower end includes holding collar means that supports itself at said bearing support means, said holding collar means being arranged close to a center of said bearing.

7. An arrangement according to claim 6, wherein said holding collar means has a bearing core extending into said bush, said bearing core including a bore guided into said holding collar means.

8. An arrangement according claim 3, further comprising a rebound plate supported on said free lower end by said holding nut, wherein said bush is arranged in a frictionally engaged manner between said holding collar means and said rebound plate.

9. An arrangement according to claim 8, wherein said bush has an oval shape such that in transverse direction said bush rests against said bearing bolt in a form-locking manner and in longitudinal direction said bush is held with play with respect to said bearing bolt.

10. An arrangement according to claim 5, wherein said bush includes projections, and said end face includes longitudinal grooves having the same axes, said grooves receiving and holding said projections in a frictionally engaged manner in a longitudinal direction and in a form-fitting manner in transverse direction.

11. An arrangement according to claim 2, wherein said supporting arm has a free upper end and tapers from said holding collar means to said free upper end.

12. An arrangement according to claim 2, wherein said upper and lower walls have openings through which said supporting arm means extends, said openings being located approximately in a vertical longitudinal central plane of said carrier such that said supporting arm means has a mounting direction from the direction of the underside of the vehicle.

13. An arrangement according to claim 6, wherein said supporting arm means is fastened and locked in said opening of said upper carrier wall by a weld, and said supporting arm means is also fastened by a weld in at least one of said opening in said lower carrier wall and an opening in said bearing support means.

* * * * *